(12) United States Patent
Onozato et al.

(10) Patent No.: US 9,441,549 B2
(45) Date of Patent: Sep. 13, 2016

(54) CONTROL DEVICE FOR INTERNAL COMBUSTION ENGINE

(71) Applicant: NISSAN MOTOR CO., LTD., Yokohama-shi, Kanagawa (JP)

(72) Inventors: Naoya Onozato, Hadano (JP); Masahiro Iriyama, Yokohama (JP); Takahiro Yoshino, Yokosuka (JP); Masahiro Arai, Yokohama (JP); Kenji Suzuki, Yokohama (JP)

(73) Assignee: NISSAN MOTOR CO., LTD., Yokohama-Shi (JP)

( * ) Notice: Subject to any disclaimer, the term of this patent is extended or adjusted under 35 U.S.C. 154(b) by 0 days.

(21) Appl. No.: 14/407,611

(22) PCT Filed: May 1, 2013

(86) PCT No.: PCT/JP2013/062729
§ 371 (c)(1),
(2) Date: Dec. 12, 2014

(87) PCT Pub. No.: WO2013/187151
PCT Pub. Date: Dec. 19, 2013

(65) Prior Publication Data
US 2015/0167559 A1 Jun. 18, 2015

(30) Foreign Application Priority Data
Jun. 14, 2012 (JP) .................................. 2012-135165

(51) Int. Cl.
*F02D 11/10* (2006.01)
*F02D 41/00* (2006.01)
(Continued)

(52) U.S. Cl.
CPC ............... *F02D 11/105* (2013.01); *F02D 9/08* (2013.01); *F02D 13/0219* (2013.01);
(Continued)

(58) Field of Classification Search
CPC .. F02D 11/105; F02D 41/30; F02D 13/0223; F02D 9/08; F02D 13/02; F02D 41/0002; F02D 13/0219; F02D 2009/0201; F02D 41/002; F02D 2041/001; F02D 2200/50; F02D 2200/501; F02D 2250/28; F02D 2250/18; Y02T 10/18; Y02T 10/42
USPC ..................... 701/104, 111, 54, 84, 102, 103
See application file for complete search history.

(56) References Cited

U.S. PATENT DOCUMENTS 6,390,063 B1 * 5/2002 Obata ....................... F01L 9/04
123/399
6,502,545 B1 * 1/2003 Ganser .................. F02D 11/105
123/348

(Continued)

FOREIGN PATENT DOCUMENTS

JP 2003-120343 A 4/2003
JP 2007-262986 A 10/2007
(Continued)

*Primary Examiner* — Stephen K Cronin
*Assistant Examiner* — Susan E Scharpf
(74) *Attorney, Agent, or Firm* — Foley & Lardner LLP

(57) ABSTRACT

A control device for internal combustion engine mounted in a vehicle includes a throttle valve provided in an intake passage of the internal combustion engine and capable of changing a cross-sectional area of the intake passage, a variable valve capable of changing opening and closing timings of an intake valve of the internal combustion engine, basic target torque calculation means for calculating a basic target torque of the internal combustion engine according to an operating state of the internal combustion engine, vibration control target torque calculation means for calculating a vibration control target torque of the internal combustion engine to suppress vehicle vibration according to a vibration component of the vehicle, and cylinder intake air amount control means for controlling a cylinder intake air amount by controlling one of the throttle valve and the variable valve according to the vibration control target torque and controlling the other of the throttle valve and the variable valve according to the basic target torque.

8 Claims, 13 Drawing Sheets

(51) Int. Cl.
  *F02D 9/08* (2006.01)
  *F02D 41/30* (2006.01)
  *F02D 13/02* (2006.01)
  *F02D 9/02* (2006.01)

(52) U.S. Cl.
  CPC ..... *F02D 13/0223* (2013.01); *F02D 41/0002* (2013.01); *F02D 41/30* (2013.01); *F02D 13/0226* (2013.01); *F02D 2009/0201* (2013.01); *F02D 2041/001* (2013.01); *F02D 2041/002* (2013.01); *F02D 2200/50* (2013.01); *F02D 2200/501* (2013.01); *F02D 2250/18* (2013.01); *F02D 2250/28* (2013.01); *Y02T 10/18* (2013.01); *Y02T 10/42* (2013.01)

(56) References Cited

U.S. PATENT DOCUMENTS

| | | | | |
|---|---|---|---|---|
| 6,553,964 B2 * | 4/2003 | Arai | ............ | F01L 9/04 |
| | | | | 123/399 |
| 6,943,460 B2 * | 9/2005 | Wakashiro | ............ | B60K 6/485 |
| | | | | 180/65.26 |
| 7,317,978 B2 * | 1/2008 | Ashizawa | ............ | B60K 6/48 |
| | | | | 701/51 |
| 7,869,931 B2 * | 1/2011 | Satou | ............ | F02D 41/123 |
| | | | | 701/101 |
| 8,010,258 B2 * | 8/2011 | Tanaka | ............ | B60K 6/48 |
| | | | | 701/48 |
| 8,010,263 B2 * | 8/2011 | Morris | ............ | B60K 6/445 |
| | | | | 701/22 |
| 2003/0075151 A1 * | 4/2003 | Machida | ............ | F02D 13/0226 |
| | | | | 123/399 |
| 2008/0183353 A1 * | 7/2008 | Post | ............ | B60G 17/0165 |
| | | | | 701/42 |
| 2009/0145381 A1 * | 6/2009 | Watanabe | ............ | B60W 10/06 |
| | | | | 123/90.15 |
| 2009/0177371 A1 * | 7/2009 | Reinke | ............ | F02D 17/04 |
| | | | | 701/111 |
| 2009/0293823 A1 * | 12/2009 | Latz | ............ | F01L 1/024 |
| | | | | 123/90.15 |
| 2010/0114460 A1 * | 5/2010 | Akimoto | ............ | B60K 6/26 |
| | | | | 701/111 |
| 2010/0268436 A1 * | 10/2010 | Soejima | ............ | F02D 37/02 |
| | | | | 701/102 |
| 2011/0112734 A1 * | 5/2011 | Whitney | ............ | B60W 30/20 |
| | | | | 701/54 |
| 2013/0046455 A1 | 2/2013 | Kato | | |

FOREIGN PATENT DOCUMENTS

| | | |
|---|---|---|
| JP | 2009-002285 A | 1/2009 |
| WO | WO 2011/142018 A1 | 11/2011 |

* cited by examiner

CONTROL DEVICE FOR INTERNAL COMBUSTION ENGINE

TECHNICAL FIELD

The prevent invention relates to a control device for internal combustion engine.

BACKGROUND ART

JP2003-120343A discloses a conventional control device for internal combustion engine in which an intake air amount is adjusted by controlling both a throttle valve and an intake valve variable mechanism so as to achieve a target torque calculated based on an operating state of an internal combustion engine.

SUMMARY OF INVENTION

One of methods for suppressing vehicle body vibration is a method for reducing vehicle body vibration by superimposing a vibration component for suppressing vehicle body vibration on a target torque to periodically vary an engine torque.

However, in the case of the conventional control device for internal combustion engine described above, a vibration component for suppressing vehicle body vibration is superimposed on control target values of both the throttle valve and the intake valve variable mechanism if both the throttle valve and the intake valve variable mechanism are controlled by superimposing the vibration component capable of suppressing vehicle body vibration on a target torque to control the vibration of a vehicle body.

Here, an intake air density in an intake manifold (intake air density downstream of the throttle valve) changes with a predetermined intake response delay after the throttle valve is controlled. On the other hand, a cylinder volume at an intake valve closing timing (hereinafter, referred to as an "effective cylinder volume") changes at the same time as the intake valve variable mechanism is controlled.

Thus, if the vibration component for suppressing vehicle body vibration is superimposed on the control target values of both the throttle valve and the intake valve variable mechanism, there has been a problem that a phase difference is created between the vibration components superimposed on the both due to response speed differences of the intake air density and the effective cylinder volume, a desired engine torque cannot be obtained and vehicle body vibration cannot be suppressed.

The present invention was developed in view of such a problem and aims to obtain a desired engine torque variation and suppress vehicle body vibration by appropriately controlling a throttle valve and an intake valve variable mechanism.

According to one aspect of the present invention, a control device for internal combustion engine mounted in a vehicle is provided which includes a throttle valve provided in an intake passage of the internal combustion engine and capable of changing a cross-sectional area of the intake passage, a variable valve capable of changing opening and closing timings of an intake valve of the internal combustion engine, basic target torque calculation means for calculating a basic target torque of the internal combustion engine according to an operating state of the internal combustion engine, vibration control target torque calculation means for calculating a vibration control target torque of the internal combustion engine to suppress vehicle vibration according to a vibration component of the vehicle, and cylinder intake air amount control means for controlling one of the throttle valve and the variable valve according to the vibration control target torque and controlling the other of the throttle valve and the variable valve according to the basic target torque.

Embodiments and advantages of the present invention are described in detail below with reference to the accompanying drawings.

DESCRIPTION OF EMBODIMENT

First Embodiment

Figure 1:
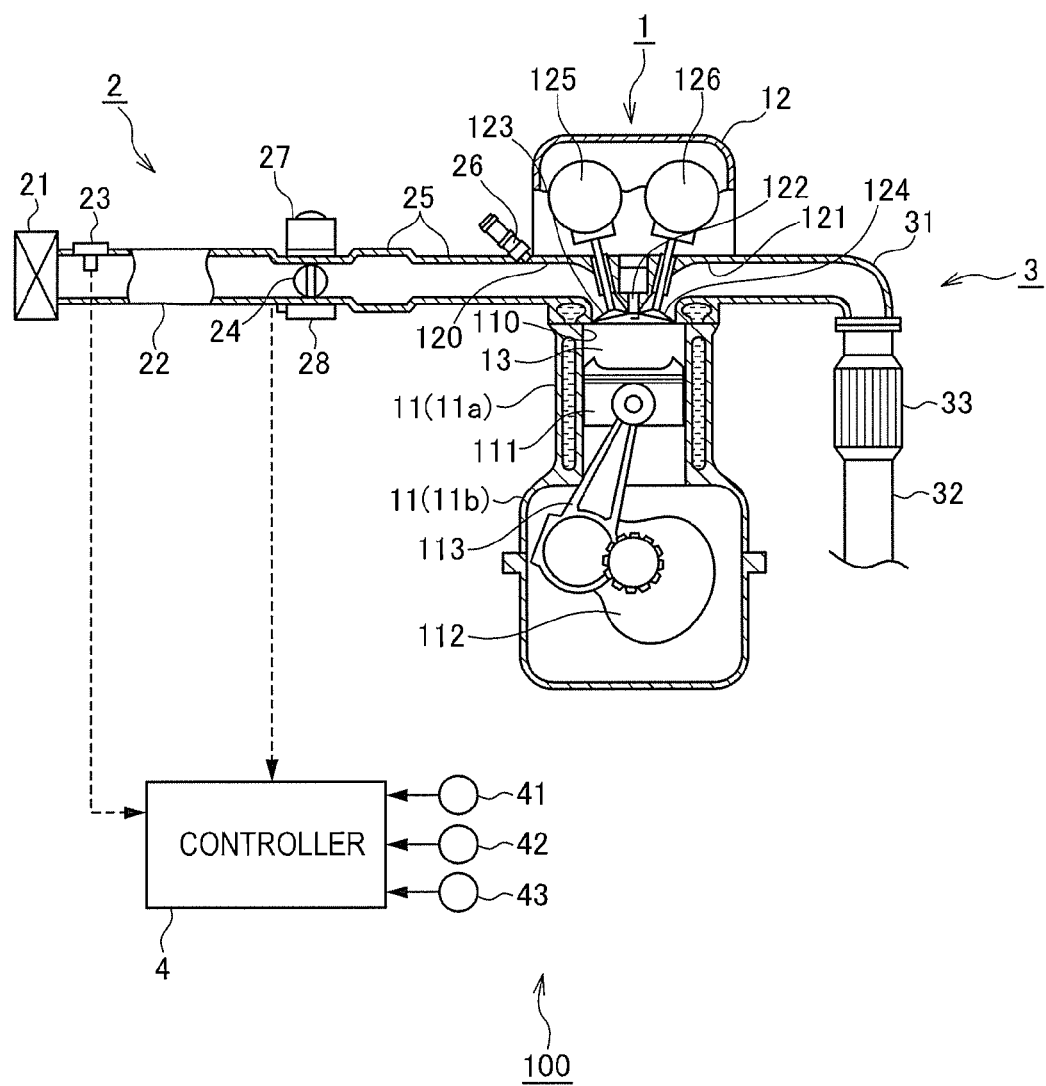
FIG. 1 is a schematic configuration diagram of a vibration control device of a vehicle according to a first embodiment.

FIG. 1 is a schematic configuration diagram of an engine control device 100 according to a first embodiment of the present invention.

The engine control device 100 includes an engine 1, an intake device 2, an exhaust device 3 and a controller 4.

The engine 1 includes a cylinder block 11 and a cylinder head 12.

The cylinder block 11 includes a cylinder part 11a and a crank case part 11b.

The cylinder part 11a is formed with a plurality of cylinders 110. A piston 111 which reciprocates in the cylinder 110 upon receiving a combustion pressure is housed in the cylinder 110.

The crank case part 11b is formed below the cylinder part 11a. The crank case part 11b rotatably supports a crankshaft 112. The crankshaft 112 translates reciprocal movements of the pistons 111 into rotational movements via conrods 113.

The cylinder head 12 is mounted on the upper surface of the cylinder block 11 and forms parts of combustion chambers 13 together with the cylinders 110 and the pistons 111.

The cylinder head 12 is formed with intake ports 120 connected to the intake device 2 and open on the top walls of the combustion chambers 13 and exhaust ports 121 connected to the exhaust device 3 and open on the top walls of the combustion chambers 13, and ignition plugs 122 are provided to face the centers of the top walls of the combustion chambers 13. Further, the cylinder head 12 includes intake valves 123 for opening and closing openings between the combustion chambers 13 and the intake ports 120 and exhaust valves 124 for opening and closing openings between the combustion chambers 13 and the exhaust ports 121. Further, the cylinder head 12 includes intake valve variable mechanisms 125 capable of driving to open and close the intake valves 123 and setting arbitrary opening and closing timings of the intake valves 123 and exhaust valve variable mechanisms 126 capable of driving to open and close the exhaust valves 124 and setting arbitrary opening and closing timings of the exhaust valves 124.

A VVEL (Variable Valve Event & Lift) capable of continuously enlarging/reducing a lift/operation angle of the intake valve 123 and continuously retarding/advancing a lift center angle of the intake valve 123, a VTC (Valve Timing Control) capable of continuously retarding/advancing the lift center angle of the intake valve 123 or the like can be used as the intake valve variable mechanism 125. A mechanism similar to the intake valve variable mechanism 125 can be used as the exhaust valve variable mechanism 126.

The intake device 2 includes an air cleaner 21, an intake passage 22, an air flow meter 23, an electronically controlled throttle valve 24, an intake manifold 25 and fuel injection valves 26.

The air cleaner 21 removes foreign substances such as sand contained in intake air.

The intake passage 22 introduces the intake air flowing via the air cleaner 21 to the intake manifold 25.

The air flow meter 23 detects an intake air amount.

The throttle valve 24 adjusts an intake air density (intake air pressure) in the intake manifold 25 by changing a passage cross-sectional area of the intake passage 22. The throttle valve 24 is driven to be opened and closed by a throttle actuator 27 and an opening thereof (hereinafter, referred to as a "throttle opening") is detected by a throttle sensor 28.

The intake manifold 25 is connected to the intake ports 120 of the engine 1 and introduces the intake air flowing via the throttle valve 24 equally into each cylinder 110.

The fuel injection valve 26 injects fuel toward the intake port 120 according to an operating state of the engine 1.

The exhaust device 3 includes an exhaust manifold 31, an exhaust passage 32 and a three-way catalyst 33.

The exhaust manifold 31 discharges exhaust air discharged from each cylinder 110 to the exhaust passage 32 after collecting it.

The exhaust passage 32 discharges the exhaust air discharged from the exhaust manifold 31 to outside air via the three-way catalyst 33 and a muffler (not shown).

The three-way catalyst 33 removes toxic substances such as hydrocarbon and nitrogen oxides in the exhaust air.

The controller 4 is configured by a microcomputer including a central processing unit (CPU), a read-only memory (ROM), a random access memory (RAM) and an input/output interface (I/O interface).

To the controller 4 are input signals from various sensors for detecting the operating state of the vehicle such as an engine rotation speed sensor 41 for detecting an engine rotation speed based on a crank angle, an accelerator pedal stroke sensor 42 for detecting a depression amount of an accelerator pedal as an engine load (hereinafter, referred to as an "accelerator operation amount") and a vibration sensor 43 for detecting a vibration component (vibration frequency and amplitude) of vehicle body on-spring vibration such as vibration in a vehicle body pitch direction generated during the travel of the vehicle besides detection signals from the air flow meter 23 and the throttle sensor 28 described above.

A method for superimposing a vibration component capable of reducing vehicle body on-spring vibration on an engine torque is known as a method for reducing the vehicle body on-spring vibration. In this method, a torque obtained by superimposing a vibration control torque for suppressing vehicle body vibration calculated according to the vehicle body on-spring vibration on a basic target engine torque determined according to the accelerator operation amount is calculated as a final target engine torque. Then, a target cylinder intake air amount is calculated according to the target engine torque and the cylinder intake air amount is adjusted to achieve a target cylinder intake air amount.

Here, the cylinder intake air amount can be thought to be obtained by multiplying the intake air density (intake air pressure) in the intake manifold 25 that changes according to the throttle opening by the effective cylinder volume that changes depending on the intake valve closing timing. Thus, in the engine including the intake valve variable mechanisms 125, fuel economy and acceleration performance can be improved by determining optimal intake air density (target throttle opening) and effective cylinder volume (target intake valve closing timing) as one conforming point from each isoquant curve in advance for each cylinder intake air amount by an experiment or the like as shown in FIG. 2, considering fuel economy, acceleration performance and the like.

Figure 2:
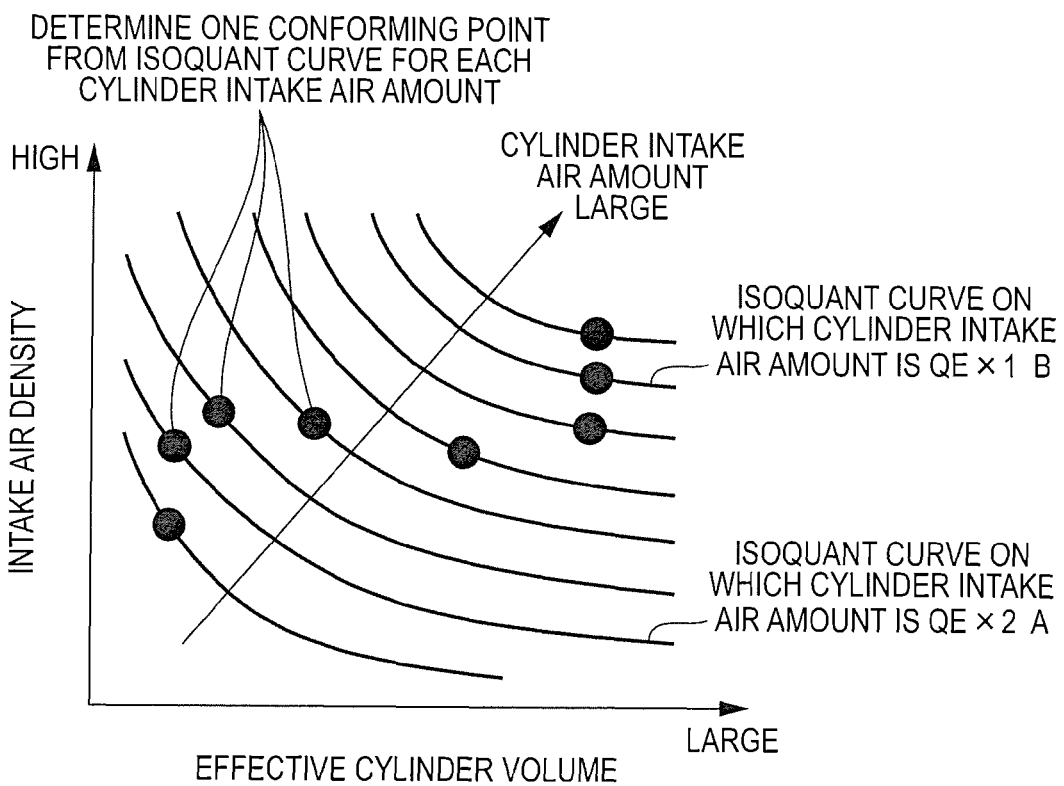
FIG. 2 is a graph showing each isoquant curve of a cylinder intake air amount when a vertical axis represents intake air density in an intake manifold and a horizontal axis represents effective cylinder volume.

FIG. 2 is a graph showing each isoquant curve of the cylinder intake air amount when a horizontal axis represents the effective cylinder volume and a vertical axis represents the intake air density in the intake manifold 25.

For example, when it is desired to adjust the cylinder intake air amount to $Q_{ex}1$, i.e. when the target cylinder intake air amount is small (when the engine load is low), a point where the intake air density is relatively high out of an isoquant curve A on which the cylinder intake air amount is $Q_{ex}1$ is selected as one conforming point. That is, the intake air pressure in the intake manifold 25 is brought closer to an atmospheric pressure by increasing the throttle opening. Since a pump loss when the engine load is low can be reduced in this way, fuel economy can be improved.

On the other hand, when it is desired to adjust the cylinder intake air amount to $Q_{ex}2$, i.e. when the target cylinder intake air amount is large (when the engine load is high), a point where the effective cylinder volume is relatively large out of an isoquant curve B on which the cylinder intake air amount is $Q_{ex}2$ is selected as one conforming point. Since charging efficiency when the engine load is high can be enhanced in this way, acceleration performance can be improved.

However, it was found that a problem of being unable to obtain a desired vibration control effect occurred if the target cylinder intake air amount was calculated based on the target engine torque obtained by superimposing the vibration control torque on the basic target engine torque to reduce the vehicle body on-spring vibration and a control was executed to achieve the intake air density and the effective cylinder volume determined as one conforming point in advance to achieve the target cylinder intake air amount.

FIGS. 13(A)-13(D) are charts showing this problem.

The vibration control torque for suppressing vehicle body vibration calculated according to the vehicle body on-spring vibration periodically increases and decreases since it cancels the vehicle body on-spring vibration. Thus, the target engine torque obtained by adding the vibration control torque to the basic target engine torque also periodically increases and decreases. As a result, as shown in FIG. 13(A), the target cylinder intake air amount calculated according to the target engine torque also periodically increases and decreases.

Figure 13:
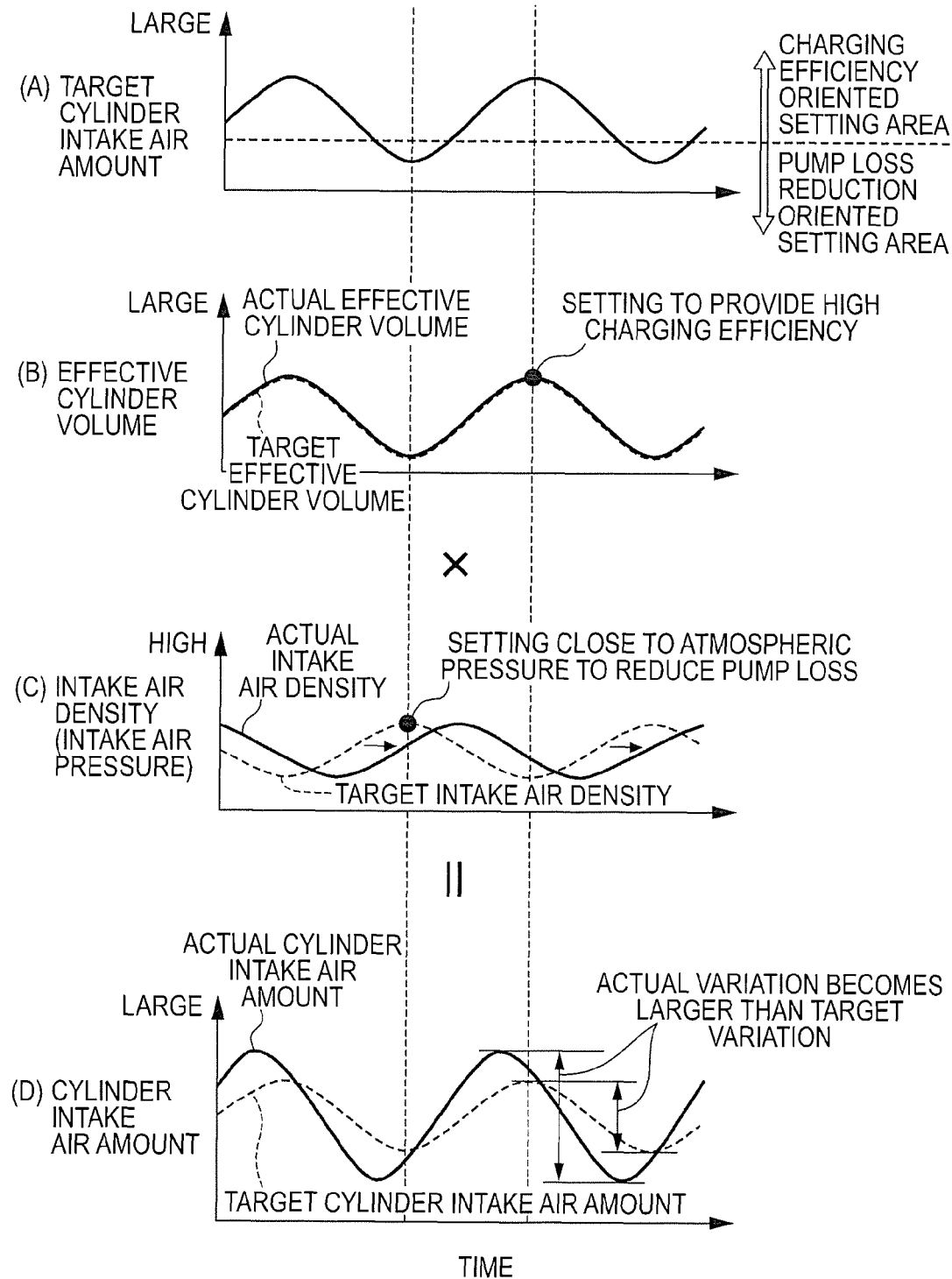
FIGS. 13(A)-13(D) are charts showing a problem by a comparative example.

Then, if the target effective cylinder volume and the target intake air density are set from a map shown in FIG. 2 based on this target cylinder intake air amount, the target effective cylinder volume and the target intake air density respectively periodically increase and decrease as shown in FIGS. 13(B) and 13(C). That is, the vibration component for reducing the vehicle body on-spring vibration is superimposed on each of the target effective cylinder volume and the target intake air density.

Here, the effective cylinder volume changes at the same time as the intake valve closing timing is changed by the intake valve variable mechanism 125. Thus, as shown in FIG. 13(B), an actual effective cylinder volume changes to the target effective cylinder volume at the same time as the intake valve variable mechanism 125 is so controlled that the effective cylinder volume reaches the target effective cylinder volume.

On the other hand, the intake air density in the intake manifold 25 changes with a predetermined response delay after the throttle opening is changed. Thus, as shown in FIG. 13(C), an actual intake air density changes to the target intake air density after the elapse of a predetermined time after the throttle valve 24 is so controlled that the intake air density reaches the target intake air density.

As just described, since there is a difference between changing speeds of the effective cylinder volume and the intake air density, a variation of the actual cylinder intake air amount is larger than that of the target cylinder intake air amount as shown in FIG. 13(D) if the vibration component for reducing the vehicle body on-spring vibration is superimposed on each of the target effective cylinder volume and the target intake air density. As a result, an actual engine torque variation becomes larger than a targeted engine torque variation, i.e. an engine torque variation capable of obtaining a vibration control effect, whereby a desired vibration control effect cannot be obtained.

Accordingly, in the present embodiment, only either the effective cylinder volume or the intake air density is periodically increased and decreased. That is, the vibration component for reducing the vehicle body on-spring vibration is superimposed only on either the target effective cylinder volume or the target intake air density. An engine control for suppressing vehicle body vibration according to the present embodiment is descried below.

Figure 3:
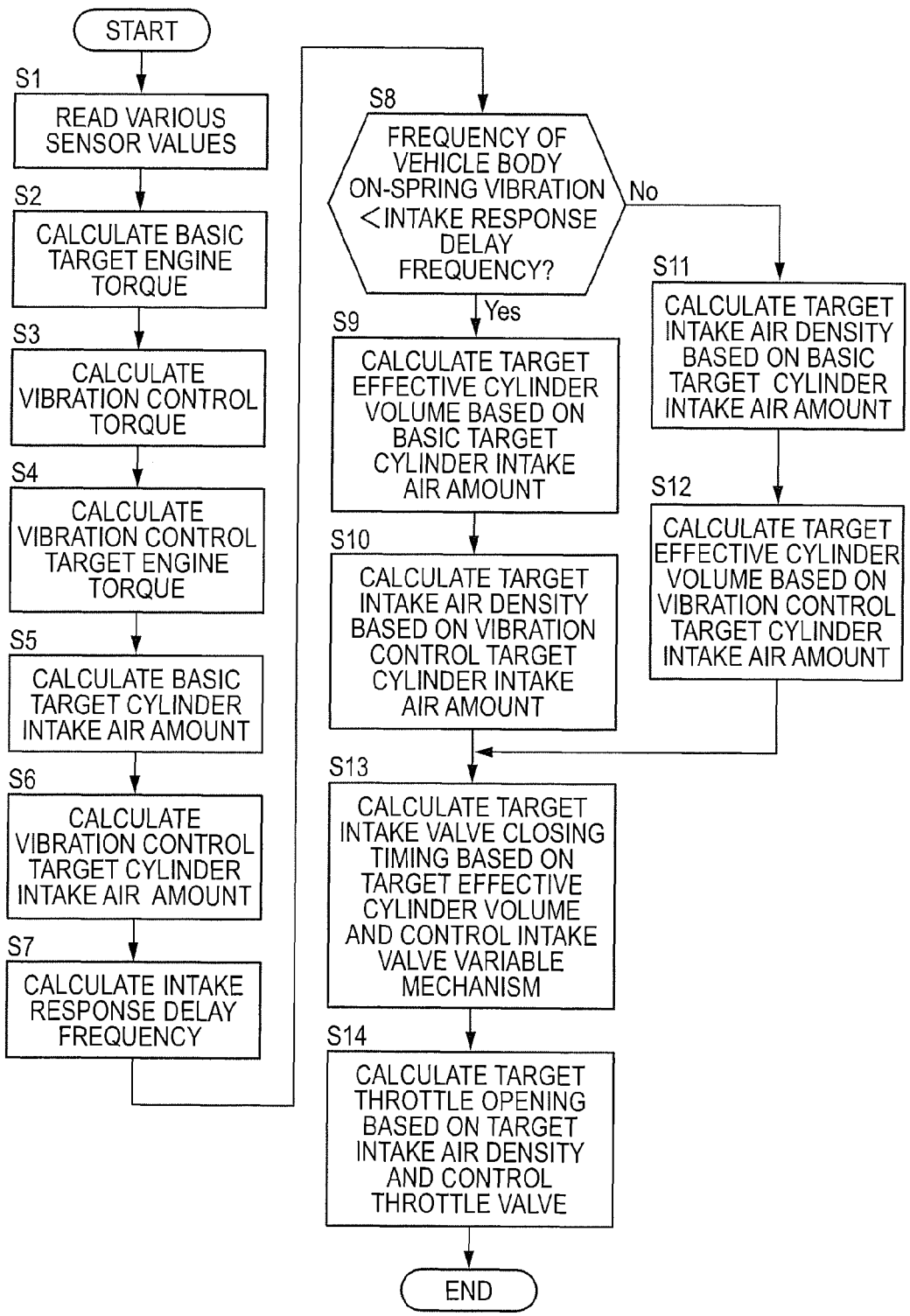
FIG. 3 is a flow chart showing an engine control for suppressing vehicle body vibration according to the first embodiment of the present invention.

FIG. 3 is a flow chart showing the engine control for suppressing vehicle body vibration according to the present embodiment.

In Step S1, the controller 4 reads detection values of various sensors described above.

In Step S2, the controller 4 calculates the basic target engine torque based on the accelerator operation amount. The basic target engine torque increases with an increase in the accelerator operation amount.

In Step S3, the controller 4 calculates the vibration control torque having a vibration component (vibration frequency and amplitude) capable of canceling the vehicle body on-spring vibration based on the vehicle body on-spring vibration. The vibration control torque is associated with a periodic variation.

In Step S4, the controller 4 calculates a vibration control target engine torque by adding the vibration control torque to the basic target engine torque.

In Step S5, the controller 4 calculates the basic target cylinder intake air amount based on the basic target engine torque. The basic target cylinder intake air amount is a cylinder intake air amount necessary for the engine torque to reach the basic target engine torque.

In Step S6, the controller 4 calculates a vibration control target cylinder intake air amount based on the vibration control target engine torque. The vibration control target cylinder intake air amount is a cylinder intake air amount necessary for the engine torque to reach the basic target engine torque.

In Step S7, the controller 4 refers to a map determined in advance by an experiment or the like and calculates an intake response delay frequency $f_{air}$ according to the engine rotation speed and the accelerator operation speed (engine load). Here, the intake response delay frequency $f_{air}$ is a value defined by the following equation (1) when T denotes a response delay time constant of an intake air density change when the throttle opening is changed.

$$f_{air}=1/T \qquad (1)$$

In Step S8, the controller 4 determines whether or not a frequency $f_{body}$ of the vehicle body on-spring vibration is below the intake response delay frequency $f_{air}$. The controller 4 performs processings of Step S9 and subsequent Steps to superimpose the vibration component only on the intake air density if the frequency $f_{body}$ of the vehicle body on-spring vibration is below the intake response delay frequency $f_{air}$. On the other hand, processings of Step S11 and subsequent Steps are performed to superimpose the vibration component only on the effective cylinder volume if the frequency $f_{body}$ of the vehicle body on-spring vibration is not below the intake response delay frequency $f_{air}$.

It should be noted that the superimposition of the vibration component is switched between the intake air density and the effective cylinder volume according to the frequency $f_{body}$ of the vehicle body on-spring vibration for the following reason.

Although the effective cylinder volume does not change even if the intake air density changes, the intake air density changes, thought only to a small extent, if the effective cylinder volume changes.

Here, if the frequency $f_{body}$ of the vehicle body on-spring vibration is not below the intake response delay frequency $f_{air}$, a frequency of the vibration control torque for reducing the vehicle body on-spring vibration becomes relatively high and the vibration control torque periodically and rapidly varies. Thus, even if the effective cylinder volume is periodically varied by superimposing the vibration component on the effective cylinder volume, the effective cylinder volume periodically and rapidly varies before the intake air density changes in response to a change of the effective cylinder volume, wherefore the intake air density hardly varies.

Further, since the vibration control torque periodically and rapidly varies, the generated vehicle body on-spring vibration can be more rapidly reduced by superimposing the vibration component on the effective cylinder volume that varies without a response delay than by superimposing the vibration component on the intake air density that varies with a predetermined response delay.

On the other hand, when the frequency $f_{body}$ of the vehicle body on-spring vibration is below the intake response delay frequency $f_{air}$, the frequency of the vibration control torque for reducing the vehicle body on-spring vibration becomes relatively low and a periodic variation of the vibration control torque becomes moderate. Thus, if the vibration component is superimposed on the effective cylinder volume, a periodic variation of the effective cylinder volume also becomes moderate. Thus, when the cylinder volume periodically varies, the intake air density also changes in response to a change of the effective cylinder volume. Then, the intake air density periodically varies as the effective cylinder volume periodically varies, whereby both the effective cylinder volume and the intake air density periodically vary. As a result, a desired engine torque variation cannot be obtained and a desired vibration control effect cannot be obtained.

Accordingly, the vibration component is superimposed on the effective cylinder volume when the frequency $f_{body}$ of the vehicle body on-spring vibration is not below the intake response delay frequency $f_{air}$ while being superimposed on the intake air density when the frequency $f_{body}$ of the vehicle body on-spring vibration is below the intake response delay frequency $f_{air}$.

Figure 4:
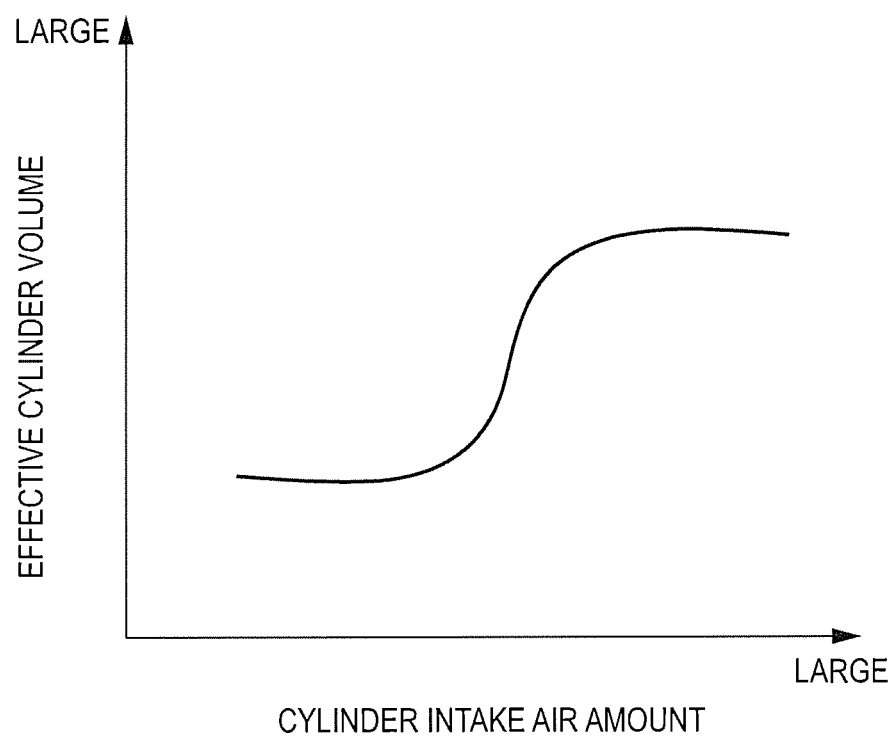
FIG. 4 is a table for calculating the effective cylinder volume based on the cylinder intake air amount.

In Step S9, the controller 4 refers to a table of FIG. 4 and calculates the target effective cylinder volume based on the basic target cylinder intake air amount. The table of FIG. 4 is a table obtained by plotting the effective cylinder volume determined as one conforming point for each cylinder intake air amount described with reference to the map of FIG. 2 with the cylinder intake air amount as a horizontal axis.

Figure 5:
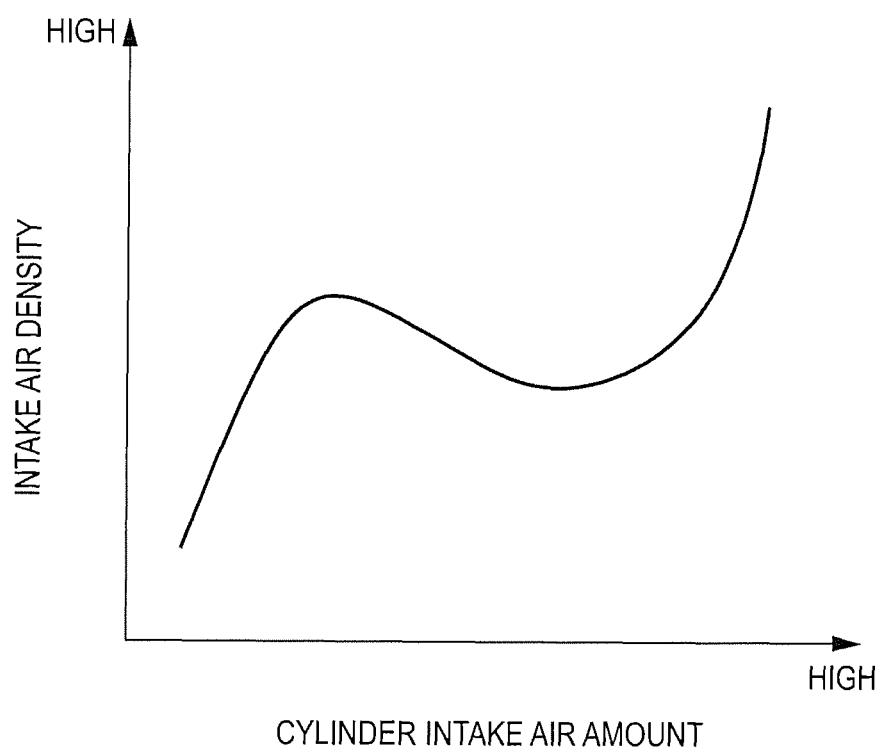
FIG. 5 is a table for calculating an intake air density based on the cylinder intake air amount.

In Step S10, the controller 4 refers to a table of FIG. 5 and calculates the target intake air density based on the vibration control target cylinder intake air amount. The table of FIG. 5 is a table obtained by plotting the intake air density determined as one conforming point for each cylinder intake air amount described with reference to the map of FIG. 2 with the cylinder intake air amount as a horizontal axis.

In Step S11, the controller 4 refers to the table of FIG. 5 and calculates the target intake air density based on the basic target cylinder intake air amount.

In Step S12, the controller 4 refers to the table of FIG. 4 and calculates the target effective cylinder volume based on the vibration control target cylinder intake air amount.

Figure 6:
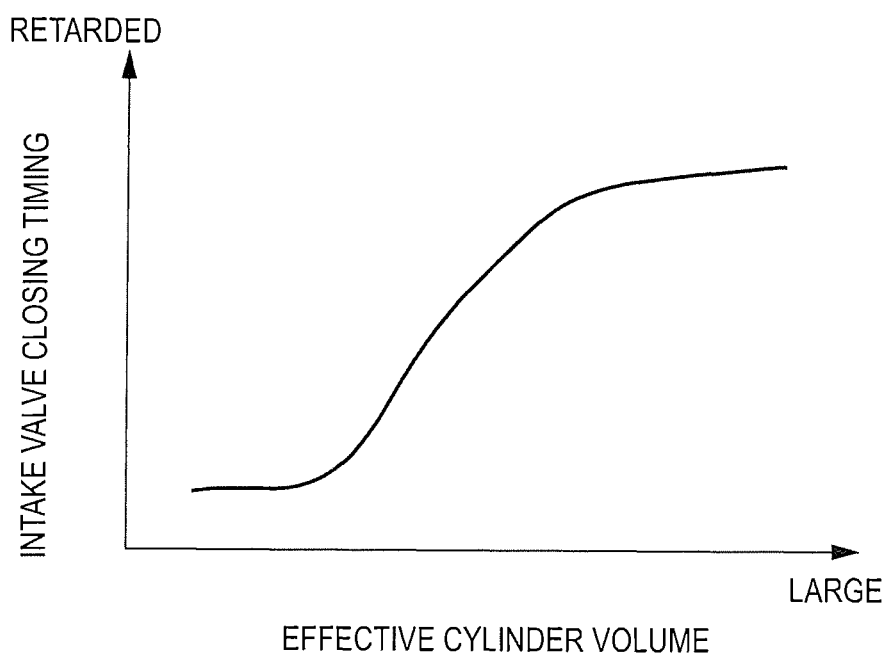
FIG. 6 is a table for calculating a target intake valve closing timing based on a target effective cylinder volume.

In Step S13, the controller 4 refers to the table of FIG. 6 and calculates the target intake valve closing timing based on the target effective cylinder volume. Then, the intake valve variable mechanism 125 is so controlled that the intake valve closing timing reaches the target intake valve closing timing.

Figure 7:
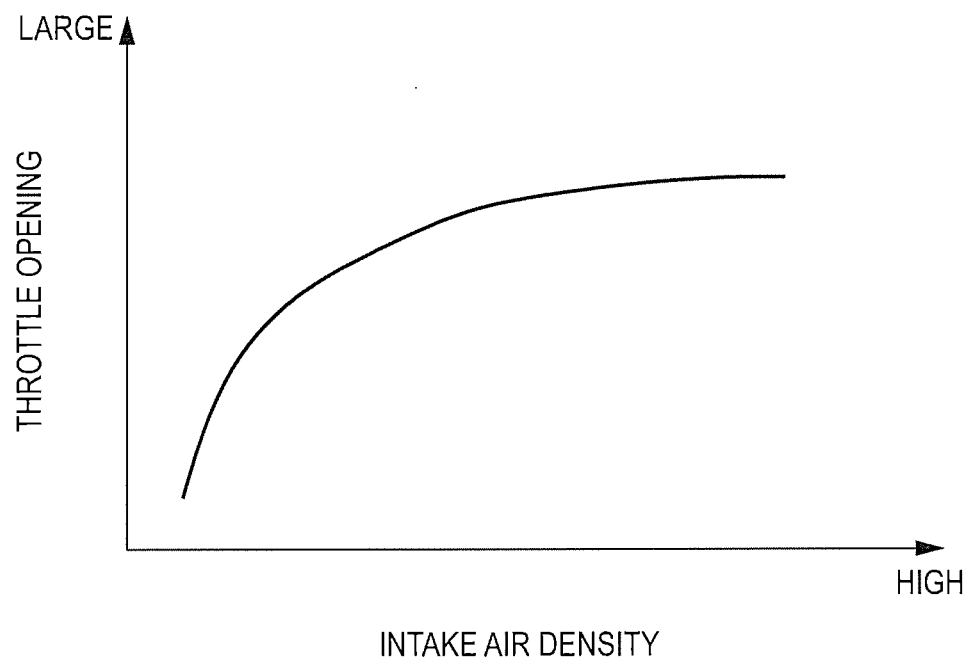
FIG. 7 is a table for calculating a target throttle opening based on a target intake air density.

In Step S14, the controller 4 refers to a table of FIG. 7 and calculates a target throttle opening based on the target intake air density. Then, the throttle valve 24 is so controlled that the throttle opening reaches the target throttle opening.

Figure 8:
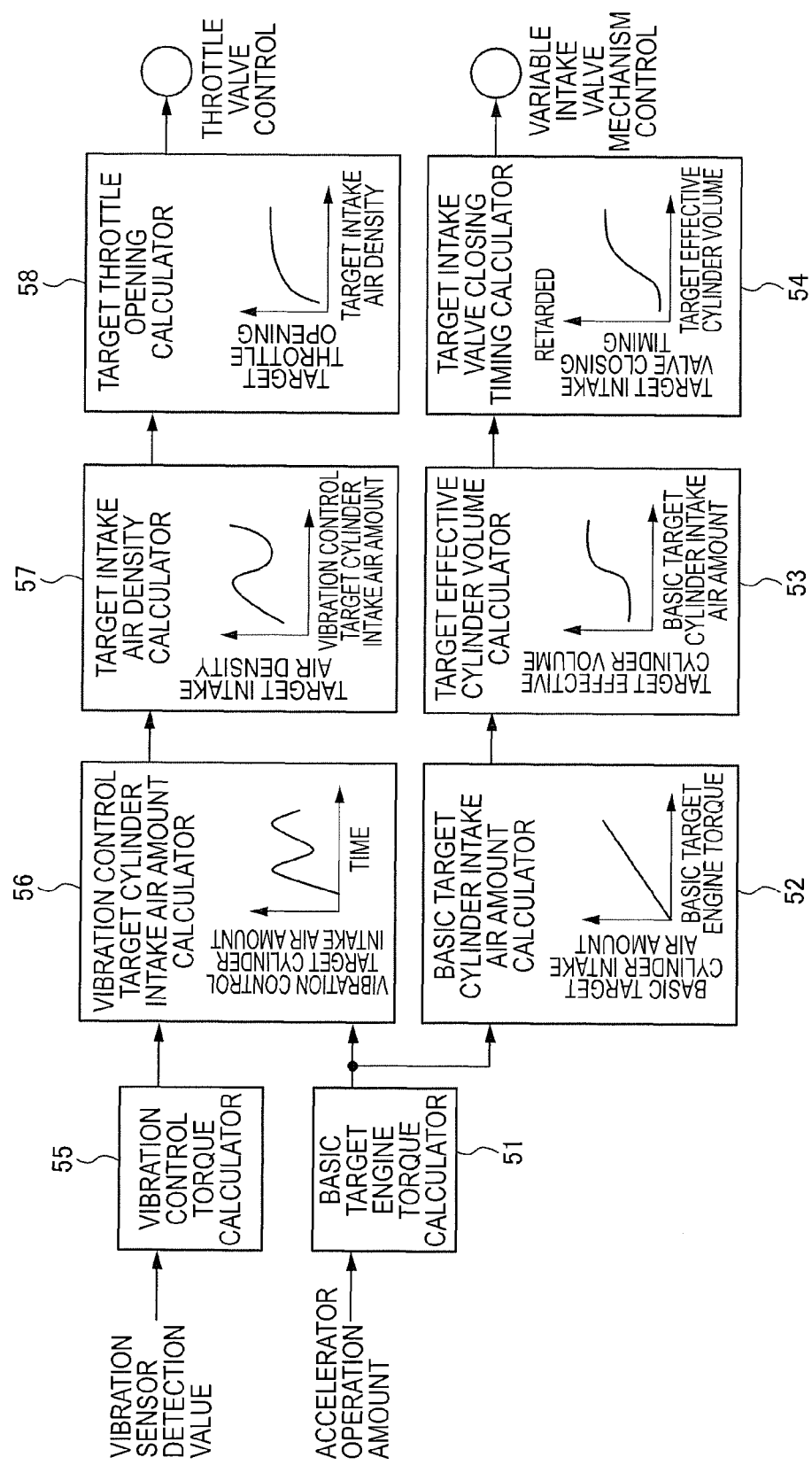
FIG. 8 is a block diagram showing contents of the engine control for suppressing vehicle body vibration according to the first embodiment of the present invention.

FIG. 8 is a block diagram showing contents of the engine control for suppressing vehicle body vibration when the frequency $f_{body}$ of the vehicle body on-spring vibration is below the intake response delay frequency $f_{air}$.

The accelerator operation amount detected by the accelerator pedal stroke sensor is input to a basic target engine torque calculator 51. The basic target engine torque calculator 51 calculates the basic target engine torque based on the accelerator operation amount.

The basic target engine torque is input to a basic target cylinder intake air amount calculator 52. The basic target cylinder intake air amount calculator 52 calculates the basic target cylinder intake air amount based on the basic target engine torque.

The basic target cylinder intake air amount is input to a target effective cylinder volume calculator 53. The target effective cylinder volume calculator 53 calculates the target effective cylinder volume based on the basic target cylinder intake air amount.

The target effective cylinder volume is input to a target intake valve closing timing calculator 54. The target intake valve closing timing calculator 54 calculates the target intake valve closing timing based on the target effective cylinder volume. Then, the intake valve variable mechanism 125 is so controlled that the intake valve closing timing reaches this target intake valve closing timing.

The vibration component (frequency and amplitude) of the vehicle body on-spring vibration detected by the vibration sensor 43 is input to a vibration control torque calculator 55. The vibration control torque calculator 55 calculates the vibration control torque to be superimposed on the basic target engine torque based on the vibration component of the vehicle body on-spring vibration.

The basic target engine torque and the vibration control torque are input to a vibration control target cylinder intake air amount calculator 56. The vibration control target cylinder intake air amount calculator 56 calculates the vibration control target cylinder intake air amount based on the vibration control target engine torque obtained by superimposing the vibration control torque on the basic target engine torque.

The vibration control target cylinder intake air amount is input to a target intake air density calculator 57. The target intake air density calculator 57 calculates the target intake air density based on the vibration control target cylinder intake air amount.

The target intake air density is input to a target throttle opening calculator 58. The target throttle opening calculator 58 calculates the target throttle opening based on the target intake air density. Then, the throttle valve 24 is so controlled that the throttle opening reaches this target throttle opening.

Figure 9:
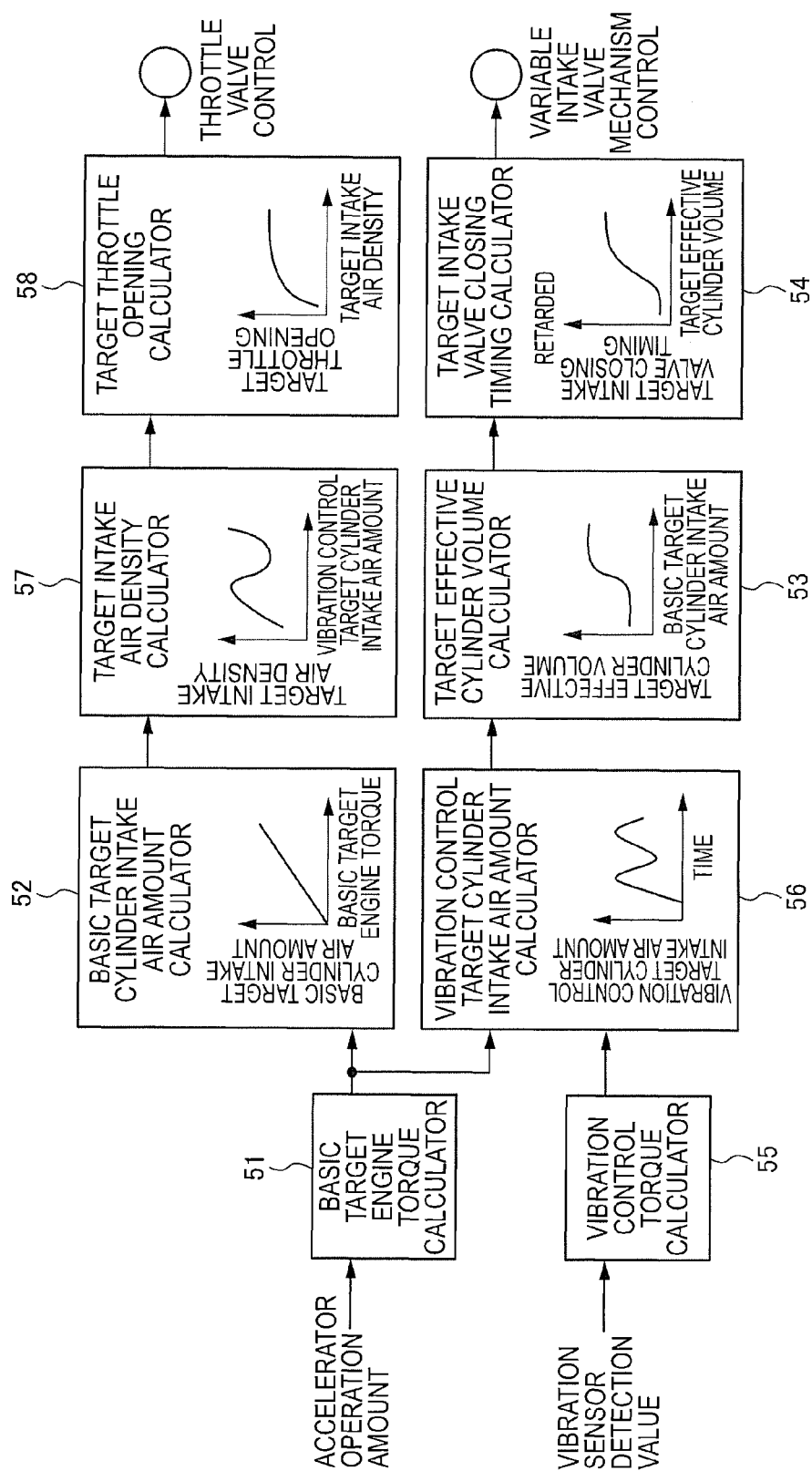
FIG. 9 is a block diagram showing contents of the engine control for suppressing vehicle body vibration according to the first embodiment of the present invention.

FIG. 9 is a block diagram showing contents of the engine control for suppressing vehicle body vibration when the frequency $f_{body}$ of the vehicle body on-spring vibration is not below the intake response delay frequency $f_{air}$.

As shown in FIG. 9, when the frequency $f_{body}$ of the vehicle body on-spring vibration is not below the intake response delay frequency $f_{air}$, the vibration control target cylinder intake air amount is input to the target effective cylinder volume calculator 53 and the target effective cylinder volume is calculated based on the vibration control target cylinder intake air amount. Then, the basic target cylinder intake air amount is input to the target intake air density calculator 57 and the target intake air density is calculated based on the basic target cylinder intake air amount.

Figure 10:
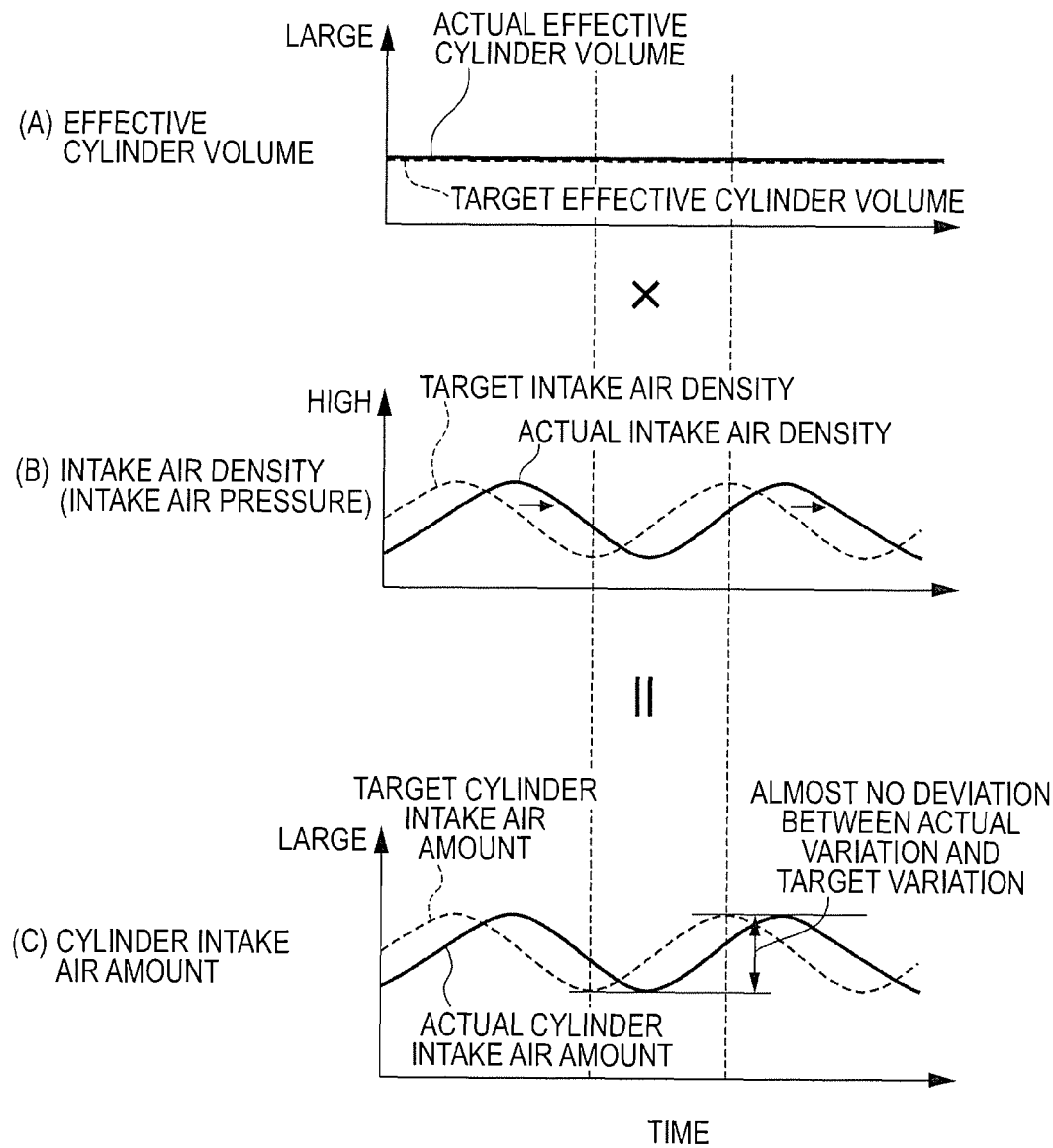
FIGS. 10(A)-10(C) are time charts showing the operation of the engine control for suppressing vehicle body vibration according to the first embodiment of the present invention.

FIGS. 10(A)-10(C) are time charts showing the operation of the engine control for suppressing vehicle body vibration when the frequency $f_{body}$ of the vehicle body on-spring vibration is below the intake response delay frequency $f_{air}$ in a steady state where the accelerator operation amount is constant.

When the frequency $f_{body}$ of the vehicle body on-spring vibration is below the intake response delay frequency $f_{air}$, the effective cylinder volume is controlled to reach the target effective cylinder volume calculated based on the basic target cylinder intake air amount. The basic target cylinder intake air amount is a value which changes according to the accelerator operation amount. Accordingly, as shown in FIG. 10(A), the basic target cylinder intake air amount is also constant and the target effective cylinder volume calculated based on the basic target cylinder intake air amount is also constant in the steady state where the accelerator operation amount is constant.

On the other hand, the intake air density is controlled to reach the target intake air density calculated based on the vibration control target cylinder intake air amount. The vibration control target cylinder intake air amount is calculated based on the vibration control target engine torque obtained by superimposing the vibration control torque, which periodically varies, as the vibration component for reducing the vehicle body on-spring vibration on the basic target engine torque. Thus, as shown in FIG. 10(B), the target intake air density calculated based on the vibration control target cylinder intake air amount also periodically varies and the actual intake air density periodically varies with a predetermined response delay with respect to the target intake air density.

As just described, when the frequency $f_{body}$ of the vehicle body on-spring vibration is below the intake response delay frequency $f_{air}$, the target effective cylinder volume is calculated based on the basic target cylinder intake air amount and the target intake air density is calculated based on the vibration control target cylinder intake air amount. In this way, only the intake air density can be periodically varied while the effective cylinder volume is kept controlled to be constant.

Thus, as shown in FIG. 10(C), a variation of the actual cylinder intake air amount obtained by multiplying the actual intake air density by the actual effective cylinder volume does not become larger than that of the vibration control target cylinder intake air amount. Therefore, a desired engine torque variation can be obtained and a desired vibration control effect can be obtained.

Further, when the frequency $f_{body}$ of the vehicle body on-spring vibration is below the intake response delay frequency $f_{air}$, only the intake air density is periodically varied, thereby preventing the intake air density from periodically varying as the effective cylinder volume periodically varies and, hence, preventing both the effective cylinder volume and the intake air density from periodically varying. Thus, a desired vibration control effect can be more reliably obtained.

Figure 11:
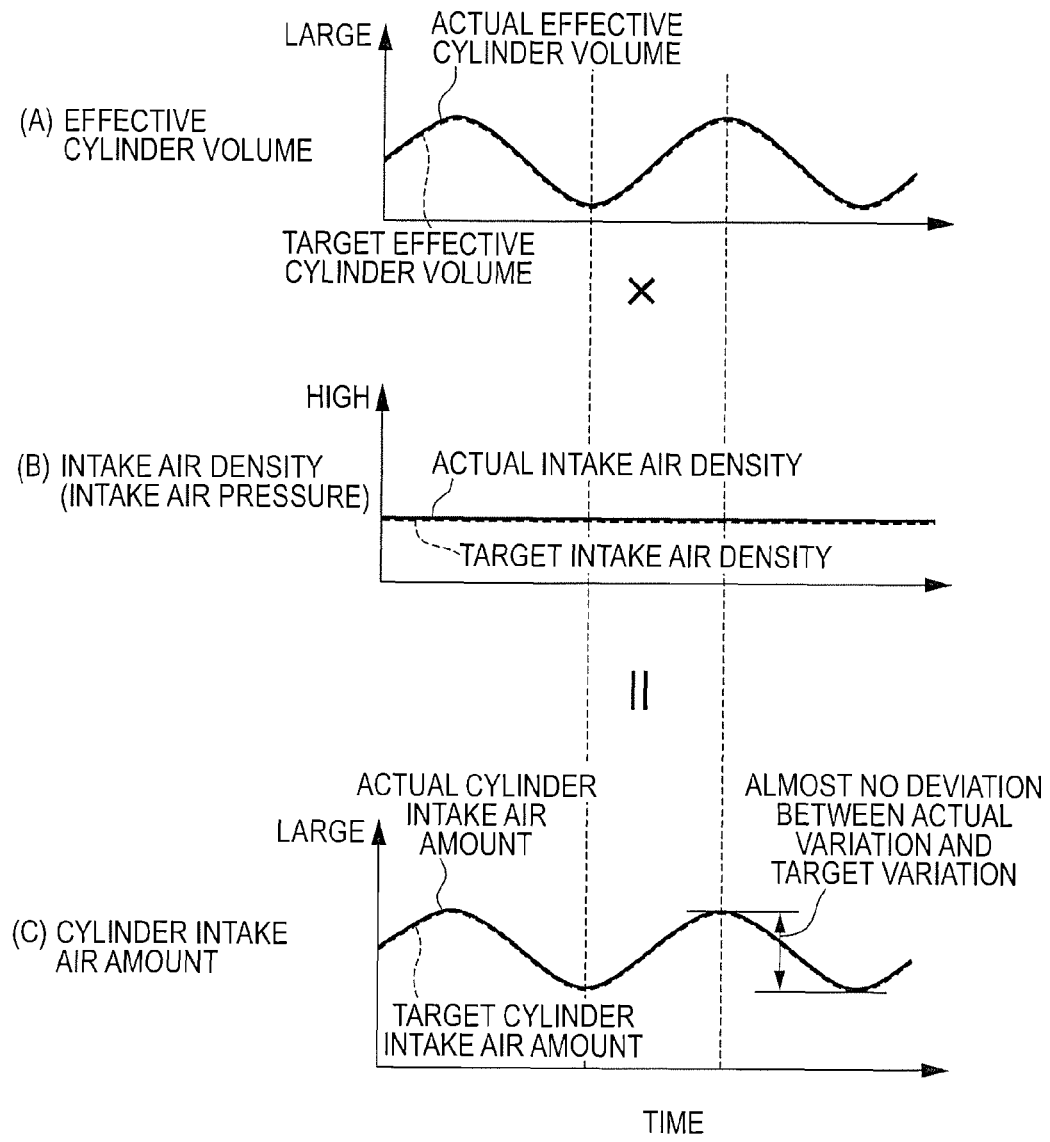
FIGS. 11(A)-11(C) are time charts showing the engine control for suppressing vehicle body vibration according to the first embodiment of the present invention.

FIGS. 11(A)-11(C) are time charts showing the operation of the engine control for suppressing vehicle body vibration when the frequency $f_{body}$ of the vehicle body on-spring vibration is not below the intake response delay frequency $f_{air}$ in the steady state where the accelerator operation amount is constant.

When the frequency $f_{body}$ of the vehicle body on-spring vibration is not below the intake response delay frequency $f_{air}$, the effective cylinder volume is controlled to reach the target effective cylinder volume calculated based on the vibration control target cylinder intake air amount. Thus, as shown in FIG. 11(A), the target effective cylinder volume periodically varies and, associated with that, the actual effective cylinder volume periodically varies without almost any delay.

On the other hand, the intake air density is controlled to reach the target intake air density calculated based on the basic target cylinder intake air amount. Thus, as shown in FIG. 11(B), the target intake air density and the actual intake air density are constant in the steady state where the accelerator operation amount is constant.

As just described, when the frequency $f_{body}$ of the vehicle body on-spring vibration is not below the intake response delay frequency $f_{air}$, the target intake air density is calculated based on the basic target cylinder intake air amount and the target effective cylinder volume is calculated based on the vibration control target cylinder intake air amount. In this way, only the effective cylinder volume can be periodically varied while the intake air density is kept controlled to be constant.

Thus, as shown in FIG. 11(C), a variation of the actual cylinder intake air amount obtained by multiplying the actual intake air density by the actual effective cylinder volume does not become larger than that of the vibration control target cylinder intake air amount. Therefore, a desired engine torque variation can be obtained and a desired vibration control effect can be obtained.

Further, when the frequency $f_{body}$ of the vehicle body on-spring vibration is not below the intake response delay frequency $f_{air}$, the vibration control target cylinder intake air amount periodically and rapidly varies. The generated vehicle body on-spring vibration can be rapidly reduced by superimposing the vibration component only on the effective cylinder volume that varies without any response delay.

Second Embodiment

Next, a second embodiment of the present invention is described with reference to FIG. 12. The present embodiment differs from the first embodiment in that a target cylinder volume or a target intake air density is calculated based on a corrected vibration control target cylinder intake air amount. The following description is made, centering on that point of difference. It should be noted that parts achieving functions similar to those of the first embodiment described above are denoted by the same reference signs and not repeatedly described in each following embodiment.

As in the first embodiment, only an intake air density periodically varies, for example, when a target cylinder volume is calculated based on a basic target cylinder intake air amount and a target intake air density is calculated based on a vibration control target cylinder intake air amount. Thus, the occurrence of deviation between an actual engine torque variation and a targeted engine torque variation due to a response delay of the intake air density can be suppressed.

However, a cylinder intake air amount (estimated cylinder intake air amount) obtained by multiplying the target cylinder volume calculated based on the basic target cylinder intake air amount and the target intake air density calculated based on the vibration control target cylinder intake air amount is not the vibration control target cylinder intake air amount. Thus, there is slight deviation between the actual engine torque variation and the targeted engine torque variation although this deviation is not as much as the one that occurs due to the response delay of the intake air density.

Accordingly, in the present embodiment, the target cylinder volume or the target intake air density is corrected based on a corrected vibration control target cylinder intake air amount so as not to cause such deviation. An engine control for suppressing vehicle body vibration according to this embodiment is described below.

Figure 12:
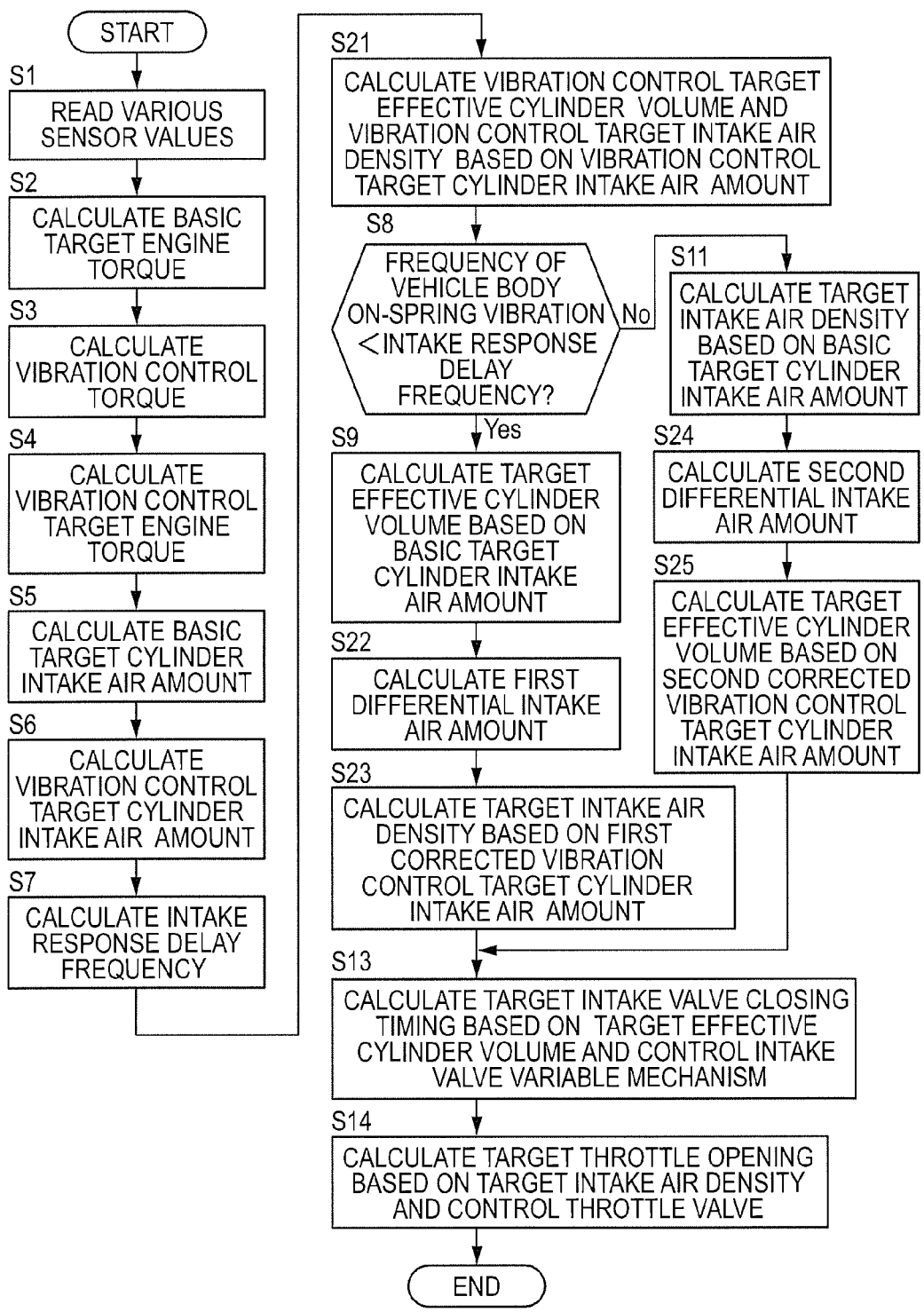
FIG. 12 is a flow chart showing an engine control for suppressing vehicle body vibration according to a second embodiment of the present invention.

FIG. 12 is a flow chart showing the engine control for suppressing vehicle body vibration according to the present embodiment.

In Step S21, the controller 4 refers to the map of FIG. 2 and calculates a vibration control target effective cylinder volume and a vibration control target intake air density determined as one conforming point in advance based on the vibration control target cylinder intake air amount.

In Step S22, the controller 4 calculates a difference (hereinafter, referred to as a "first differential intake air amount") between a cylinder intake air amount (estimated cylinder intake air amount) obtained by multiplying the target effective cylinder volume by the vibration control target intake air density and the vibration control target cylinder intake air amount. The first differential intake air amount is a deviation amount of the intake air amount between an actual cylinder intake air amount and the vibration control target cylinder intake air amount caused by calculating the target effective cylinder volume not based on the vibration control target cylinder intake air amount, but based on the basic target cylinder intake air amount.

In Step S23, the controller 4 calculates the target intake air density based on a first corrected vibration control target cylinder intake air amount obtained by adding the first differential intake air amount to the vibration control target cylinder intake air amount.

In Step S24, the controller 4 calculates a difference (hereinafter, referred to as a "second differential intake air amount") between a cylinder intake air amount (estimated cylinder intake air amount) obtained by multiplying the target intake air density by the vibration control target effective cylinder volume and the vibration control target cylinder intake air amount. The second differential intake air amount is a deviation amount of the intake air amount between the actual cylinder intake air amount and the vibration control target cylinder intake air amount caused by calculating the target intake air density not based on the vibration control target cylinder intake air amount, but based on the basic target cylinder intake air amount.

In Step S25, the controller 4 calculates the target effective cylinder volume based on a second corrected vibration control target cylinder intake air amount obtained by adding the second differential intake air amount to the vibration control target cylinder intake air amount.

As just described, when the frequency $f_{body}$ of the vehicle body on-spring vibration is below the intake response delay frequency $f_{air}$, the target effective cylinder volume is calculated based on the basic target cylinder intake air amount and the target intake air density is calculated based on the first corrected vibration control target cylinder intake air amount obtained by adding the first differential intake air amount to the vibration control target cylinder intake air amount.

As described above, the first differential intake air amount is the deviation amount of the intake air amount between the actual cylinder intake air amount and the vibration control target cylinder intake air amount caused by calculating the target effective cylinder volume not based on the vibration control target cylinder intake air amount, but based on the basic target cylinder intake air amount.

Accordingly, this deviation amount can be eliminated by calculating the target intake air density based on the first corrected vibration control target cylinder intake air amount obtained by adding the first differential intake air amount to the vibration control target cylinder intake air amount.

Further, when the frequency $f_{body}$ of the vehicle body on-spring vibration is not below the intake response delay frequency $f_{air}$, the target intake air density is calculated based on the basic target cylinder intake air amount and the target effective cylinder volume is calculated based on the second corrected vibration control target cylinder intake air amount obtained by adding the second differential intake air amount to the vibration control target cylinder intake air amount.

As described above, the second differential cylinder intake air amount is the deviation amount of the intake air amount between the actual cylinder intake air amount and the vibration control target cylinder intake air amount caused by calculating the target intake air density not based on the vibration control target cylinder intake air amount, but based on the basic target cylinder intake air amount.

Thus, this deviation amount can be eliminated by calculating the target effective cylinder volume based on the second corrected vibration control target cylinder intake air amount obtained by adding the second differential intake air amount to the vibration control target cylinder intake air amount.

By the above, according to the present embodiment, the actual engine torque variation can be brought closer to the targeted engine torque variation besides obtaining effects similar to those of the first embodiment. Thus, as compared with the first embodiment, vehicle body vibration can be further reduced.

Although the embodiments of the present invention have been described above, the above embodiments are merely an illustration of some application examples of the present invention and not of the nature to limit the technical scope of the present invention to the specific configurations of the above embodiments.

Although the vibration component of the vehicle body on-spring vibration is detected by the vibration sensor 43 in the above embodiments, an external disturbance in a front-back direction acting on wheels due to a change of each wheel speed may be, for example, calculated based on the wheel speed of each wheel detected by a wheel speed sensor and the vibration component of the vehicle body on-spring vibration may be estimated according to this external disturbance in the front-back direction.

Further, although the intake response delay frequency $f_{air}$ is calculated according to the operating state of the engine in the above embodiments, the vehicle component may be superimposed only on the effective cylinder volume in advance without calculating the intake response delay frequency $f_{air}$ regardless of the operating state of the engine 1 such as when the intake response delay frequency $f_{air}$ is sufficiently higher than the frequency $f_{body}$ of the vehicle body on-spring vibration.

Further, although the target throttle opening and the target intake air density are calculated based on the basic target cylinder intake air amount and the vibration control target cylinder intake air amount in the above embodiments, the target throttle opening and the target intake air density may be directly calculated from the basic target engine torque and the vibration control target engine torque.

Further, typical aspects of the present invention other than those stated in claims are as follows.

(1) A control device for internal combustion engine mounted in a vehicle includes an intake air density control device for controlling an intake air density in an intake manifold of the internal combustion engine, an effective cylinder volume control device for controlling an effective cylinder volume of the internal combustion engine, basic target torque calculation means for calculating a basic target torque of the internal combustion engine according to an operating state of the internal combustion engine, vibration component detection means for detecting a vibration component of the vehicle, vibration control target torque calculation means for calculating a vibration control target torque of the internal combustion engine to suppress vehicle vibration, and cylinder intake air amount control means for controlling a cylinder intake air amount by controlling one of the intake air density control device and the effective cylinder volume control device according to the vibration control target torque and controlling the other of the intake air density control device and the effective cylinder volume control device according to the basic target torque.

(2) The control device for internal combustion engine described in the above (1), wherein the cylinder intake air amount control means includes means for calculating a basic target cylinder intake air amount based on the basic target torque, means for calculating a vibration control target cylinder intake air amount based on the vibration control target torque, and means for calculating a control target value of one of the intake air density control device and the effective cylinder volume control device based on the vibration control target cylinder intake air amount and calculating a control target value of the other of the intake air density control device and the effective cylinder volume control device based on the basic target cylinder intake air amount.

(3) The control device for internal combustion engine described in the above (2) includes control target value correction means for correcting the one control target value calculated based on the vibration control target cylinder intake air amount based on a differential intake air amount between an estimated cylinder intake air amount obtained when the intake air density control device and the effective cylinder volume control device are respectively controlled to achieve the control target values and the vibration control target cylinder intake air amount.

(4) The control device for internal combustion engine described in any one of the above (1) to (3), wherein the cylinder intake air amount control means determines which of the intake air density control device and the effective cylinder volume control device is to be controlled according to the vibration control target torque based on the vibration component of the vehicle and a response characteristic of the intake air density in the intake manifold.

(5) The control device for internal combustion engine described in the above (4), wherein the cylinder intake air amount control means controls the intake air density control device according to the vibration control target torque and controls the effective cylinder volume control device according to the basic target torque when a vibration frequency of the vehicle vibration as the vibration component of the vehicle is below an intake response delay frequency expressed by an inverse of a response delay time constant of the intake air density in the intake manifold.

(6) The control device for internal combustion engine described in the above (4), wherein the cylinder intake air amount control means controls the effective cylinder volume control device according to the vibration control target torque and controls the intake air density control device according to the basic target torque when a vibration frequency of the vehicle vibration as the vibration component of the vehicle is not below an intake response delay frequency expressed by an inverse of a response delay time constant of the intake air density in the intake manifold.

(7) The control device for internal combustion engine described in any one of the above (1) to (6), wherein the vibration control target torque calculation means calculates a vibration control torque having a vibration component for canceling the vibration component of the vehicle based on the vibration component of the vehicle and calculates the vibration control target torque by superimposing the vibration control torque on the basic target torque.

(8) The control device for internal combustion engine described in any one of the above (1) to (7), wherein the intake air density control device is a throttle valve and the effective cylinder volume control device is a variable valve mechanism for an intake valve.

The present application claims a priority of Japanese Patent Application No. 2012-135165 filed with the Japan Patent Office on Jun. 14, 2012, all the contents of which are hereby incorporated by reference.

The invention claimed is:

1. A control device for internal combustion engine mounted in a vehicle, comprising:
    a throttle valve provided in an intake passage of the internal combustion engine and capable of changing a cross-sectional area of the intake passage;
    a variable valve capable of changing opening and closing timings of an intake valve of the internal combustion engine;
    a basic target torque calculation unit configured to calculate a basic target torque of the internal combustion engine according to an operating state of the internal combustion engine;
    a vibration sensor configured to detect a vibration component of the vehicle;
    a vibration control target torque calculation unit configured to calculate a vibration control target torque of the internal combustion engine to suppress vehicle vibration according to the vibration component of the vehicle detected by the vibration sensor; and
    a cylinder intake air amount control unit programmed to
        control a cylinder intake air amount by controlling one of the throttle valve and the variable valve according to the vibration control target torque and controlling another of the throttle valve and the variable valve according to the basic target torque;
        compare the vibration component detected by the vibration sensor to an intake response delay frequency;
        determine which of the throttle valve and the variable valve is to be controlled according to the vibration control target torque; and
        control the throttle valve according to the vibration control target torque when the vibration component is less than the intake response delay frequency, and control the variable valve according to the vibration control target torque when the vibration component is greater than the intake response delay frequency.

2. The control device for internal combustion engine according to claim 1, wherein the cylinder intake air amount control unit includes:
    a basic target cylinder intake air amount calculation unit configured to calculate a basic target cylinder intake air amount based on the basic target torque;
    a vibration control target cylinder intake air amount calculation unit configured to calculate a vibration control target cylinder intake air amount based on the vibration control target torque; and
    a control target value calculation unit configured to calculate a control target value of one of the throttle valve and the variable valve based on the vibration control target cylinder intake air amount and calculate a control target value of another of the throttle valve and the variable valve based on the basic target cylinder intake air amount.

3. The control device for internal combustion engine according to claim 2, comprising a control target value correction unit configured to correct the one control target value calculated based on the vibration control target cylinder intake air amount based on a differential intake air amount between an estimated cylinder intake air amount obtained when the throttle valve and the variable valve are respectively controlled to achieve the control target values and the vibration control target cylinder intake air amount.

4. The control device for internal combustion engine according to claim 1, wherein:
the cylinder intake air amount control unit determines which of the throttle valve and the variable valve is to be controlled according to the vibration control target torque based on the vibration component of the vehicle and a response characteristic of the intake air density in an intake manifold.

5. The control device for internal combustion engine according to claim 4, wherein:
the cylinder intake air amount control unit controls the throttle valve according to the vibration control target torque and controls the variable valve according to the basic target torque when a vibration frequency of the vehicle vibration as the vibration component of the vehicle is below the intake response delay frequency, which is expressed by an inverse of a response delay time constant of the intake air density in the intake manifold.

6. The control device for internal combustion engine according to claim 4, wherein the cylinder intake air amount control unit controls the variable valve according to the vibration control target torque and controls the throttle valve according to the basic target torque when a vibration frequency of the vehicle vibration as the vibration component of the vehicle is not below the intake response delay frequency, which is expressed by an inverse of a response delay time constant of the intake air density in the intake manifold.

7. The control device for internal combustion engine according to claim 1, wherein the vibration control target torque calculation unit:
calculates a vibration control torque having a vibration component for canceling the vibration component of the vehicle based on the vibration component of the vehicle; and
calculates the vibration control target torque by superimposing the vibration control torque on the basic target torque.

8. A control device for internal combustion engine mounted in a vehicle, comprising:
a throttle valve provided in an intake passage of the internal combustion engine and capable of changing a cross-sectional area of the intake passage;
a variable valve capable of changing opening and closing timings of an intake valve of the internal combustion engine;
basic target torque calculation means for calculating a basic target torque of the internal combustion engine according to an operating state of the internal combustion engine;
vibration sensing means for detecting a vibration component of the vehicle;
vibration control target torque calculation means for calculating a vibration control target torque of the internal combustion engine to suppress vehicle vibration according to the vibration component of the vehicle; and
cylinder intake air amount control means for
controlling a cylinder intake air amount by controlling one of the throttle valve and the variable valve according to the vibration control target torque and controlling another of the throttle valve and the variable valve according to the basic target torque;
comparing the vibration component detected by the vibration sensor to an intake response delay frequency;
determining which of the throttle valve and the variable valve is to be controlled according to the vibration control target torque, according to the vibration component of the vehicle;
controlling the throttle valve according to the vibration control target torque when the vibration component is less than the intake response delay frequency, and controlling the variable valve according to the vibration control target torque when the vibration component is greater than the intake response delay frequency.

* * * * *